Patented Jan. 11, 1927.

1,613,632

UNITED STATES PATENT OFFICE.

HENRY H. WILKINSON, OF BROOKLYN, NEW YORK, ASSIGNOR TO UNION SULPHUR COMPANY, A CORPORATION OF NEW JERSEY.

METHOD OF PURIFYING SULPHUR.

No Drawing.     Application filed November 26, 1923. Serial No. 677,184.

Sulphur obtained by methods involving melting of the sulphur under ground and raising the same to the surface by means of superheated water, is of sufficient purity for many commercial purposes, but however, lacks the bright yellow color and brilliant appearance demanded of the more highly purified product. It contains noticeable amounts of petroleum-like matter and occluded gases, as well as water, and in a form removable with difficulty. While suitable in this condition for agricultural and other purposes, there are many applications of sulphur where a purer product is required, and the process as described in the present specification is designed to give such a product.

Some of the processes for the manufacture of flowers of sulphur which have been described, concern themselves with methods of operation involving either reduced pressure or the use of inert gases for preventing combustion of the sulphur. It is recognized in this art that the danger from combustion of the very finely divided sulphur is great, and this danger may be minimized or avoided by the use of inert gases, or by carrying out the production of flowers of sulphur in a partial or substantially absolute vacuum.

It has now been found in the further development of these processes that the production of finely divided sulphur may be carried out at considerably lower temperatures than that of the normal atmospheric boiling point of sulphur, and considerably lower than the boiling point of the sulphur under the conditions prevaling in the apparatus, by so conducting the operation that the sulphur is virtually evaporated without actual ebullition.

To make this clearer, left it be assumed that sulphur will boil at 350° C. under a vacuum of 24 inches, then at that temperature sulphur vapor would be produced, and as such may be condensed either to a liquid or to a finely divided solid, depending upon the means employed. By the employment of a current of inert gas, such as carbon dioxide, nitrogen or flue gas, the sulphur may be carried into a relatively small condensing chamber, and there collected as a finely divided solid.

The present process differs from those processes which have preceded it in this essential, that the sulphur is vaporized at a temperature consierably below its boiling point. For example, under the conditions above outlined, the sulphur is vaporized at temperatures between 275° and 300° C. In order to obtain this effect, however, it is essential to conduct a diluent or carrying medium, such as a gas or vapor, beneath the surface of the sulphur so heated. In order to prevent combustion, a non-oxidizing and inert gas such as nitrogen, flue-gas or carbon dioxide should be employed.

This process may also be carried out at atmospheric pressure by forcing such as gas under the surface of sulphur heated to liquefaction, and conducting the gas carrying sulphur into a suitable condensing or collecting chamber. At atmospheric pressure, sulphur boils at or near 444° C., but I have found that considerable amounts of sulphur may be evaporated and converted into a very finely divided and highly purified condition by heating sulphur in a suitable vessel to a temperature of between 300°–350° C., then passing an inert gas into and under the surface of the heated sulphur, so that said gas will pass through the heated sulphur in a stream of small bubbles. This gas will absorb heat from the sulphur, but may be heated by outside means to even a higher temperature than that to which the sulphur itself has been heated. This gas, passing through the molten sulphur, will cause an evaporative effect to be applied to the sulphur, and a portion of the sulphur will be carried along by such gas in the form of diluted sulphur vapor and into a chamber connected with the primary heating vessel or retort.

I have also found it to be advantageous to further dilute the sulphur-bearing gas with further quantities of an inert gas, which may or may not be the same kind of gas which is carrying the sulphur. Under certain conditions, I have successfully employed air for the purpose of producing a chilling effect, thereby preventing or retarding the agglomeration of the particles of sulphur, which may or may not exhibit thermoplasticity.

The gas carrying the sulphur is conducted to a suitable collecting chamber, and the gas, in order to remove any entrained sulphur therein, may be bubbled through water or other liquid, and re-used by introduction into more molten sulphur as before described, the circulation being effected or maintained by either a pump, fan or other means for producing a circulation of the same.

The lower the temperature at which this method is carried out, the larger will be the ratio in the product of that form of sulphur soluble in carbon bisulphide, and thus a means is hereby provided for regulating the amount in the product, of that form of sulphur insoluble in carbon bisulphide. This is an important consideration, as commercial "flowers of sulphur" as usually produced, is high in percentage in that form of sulphur insoluble in carbon bisulphide.

Having therefore described my method, and the means whereby it may be effectuated, what I claim as new and desire to secure by patent application is:—

1. A method of producing finely divided sulphur, consisting in heating sulphur until molten but at a temperature below its boiling point under the conditions of heating, passing into and through said molten sulphur a current of gas, transferring said gas to a collecting chamber, allowing said gas to deposit sulphur in said chamber, purifying said gas, and re-introducing said purified gas into more molten sulphur, substantially as described.

2. A method of producing finely divided sulphur, consisting in heating sulphur until molten but at a temperature below its boiling point under the conditions of heating, passing into and through said molten sulphur a current of gas incapable of supporting combustion, transferring said incombustible gas to a collecting chamber, allowing said gas to deposit sulphur in said chamber, purifying said gas, and re-introducing said purified gas into more molten sulphur, substantially as described.

3. A method for the purification of sulphur by vaporization at temperatures below the boiling point of the sulphur under the conditions of treatment, characterized by passing a gas inert to the sulphur through and into said sulphur while in the molten condition, afterwards transferring said gas into a chamber suitable for the deposition of sulphur, allowing said sulphur to deposit in said chamber, purifying said gas and re-introducing the purified gas into more molten sulphur, substantially as described.

4. A method for the purification of sulphur by vaporization at temperatures below the boiling point of the sulphur under the conditions of treatment, characterized by passing an inert gas into and through said sulphur while the sulphur is in a molten condition, afterwards transferring said gas into a chamber suitable for the deposition of sulphur, allowing the sulphur to deposit from the gas in said chamber, then purifying said gas and re-introducing the purified gas into more molten sulphur, substantially as described.

5. A process for transferring sulphur from a retort wherein it is melted at a temperature below its boiling point, by passing into and through said heated sulphur a current of gas incapable of supporting combustion, said gas carrying sulphur being then led into a cooling or condensing chamber for the deposition therein of the sulphur carried by said gas, purifying the gas from the sulphur remaining therein and therewith, and returning said gas through the system for re-use by passing into and under more molten sulphur, substantially as described.

6. A method of producing finely divided sulphur, consisting in heating sulphur under conditions which will cause it to melt at a temperature below its boiling point, passing through the molten sulphur a current of inert gas, and transferring the gas and sulphur carried thereby into a condensing chamber.

Signed at Brooklyn, in the county of Kings, and State of New York, this twenty-second day of November, nineteen hundred and twenty-three.

HENRY H. WILKINSON.